United States Patent [19]

Klope et al.

[11] 4,186,777

[45] Feb. 5, 1980

[54] PRESSURE VESSEL RETAINED ENERGY MEASUREMENT SYSTEM

[75] Inventors: Lawrence R. Klope, Cedar Falls; Robert E. Haight, Waterloo, both of Iowa

[73] Assignee: Deere & Company, Moline, Ill.

[21] Appl. No.: 955,498

[22] Filed: Oct. 27, 1978

[51] Int. Cl.² .............................................. F16L 55/04

[52] U.S. Cl. ...................................................... 138/31

[58] Field of Search ................. 138/31, 30, 26; 277/2; 73/745, 714

[56] References Cited

U.S. PATENT DOCUMENTS

| | | | |
|---|---|---|---|
| 2,748,801 | 6/1956 | McCuiston | 138/31 |
| 2,804,884 | 9/1957 | Knox | 138/30 |
| 3,004,561 | 10/1961 | Henry | 138/31 |
| 3,651,697 | 3/1972 | Ianuzzi | 73/714 |
| 3,770,179 | 11/1973 | McHugh | 277/2 |

*Primary Examiner*—Lenard A. Footland

[57] ABSTRACT

A piston-type accumulator in a hydraulic circuit is provided with an interior sleeve proximate the gas valve for limiting piston movement and providing a minimum predetermined accumulator gas volume. By monitoring the pressure of the gas charge in the minimum predetermined gas volume, it may be determined whether the accumulator retains sufficient energy for proper operation in the hydraulic circuit or requires recharging.

1 Claim, 1 Drawing Figure

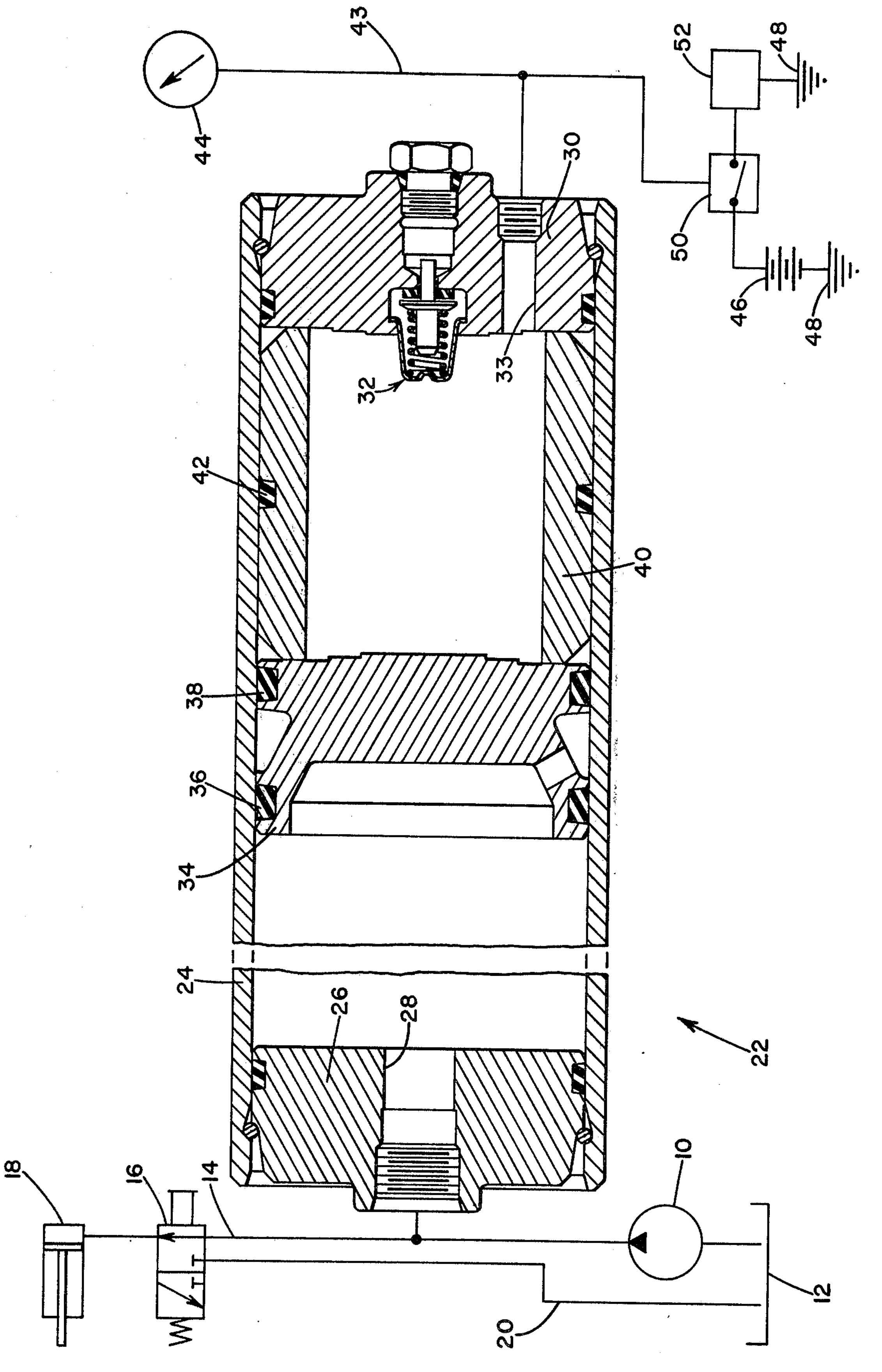
43
44
52
48
30
50
46
48
32
33
42
40
38
36
34
24
26
28
22
18
16
14
10
12
20

PRESSURE VESSEL RETAINED ENERGY MEASUREMENT SYSTEM

BACKGROUND OF THE INVENTION

The present invention relates generally to piston-type hydraulic accumulators and more particularly to a hydraulic accumulator in which it may be determined whether a predetermined minimum of retained energy exists for proper operation thereof.

In the past, there was no way of determining how much energy or working gas pressure existed in a hydraulic accumulator. Since the pressure of the gas was dependent upon the hydraulic system pressure, until the piston bottomed out due to the lack of sufficient gas pressure, there was no way of telling whether a sufficient gas pressure existed in the accumulator to be satisfactory for proper operation of the hydraulic circuit. Thus, the first indication of a lack of sufficient energy or gas pressure was sometimes indicated by the failure of the accumulator to operate properly and a catastrophic failure of some other component in the hydraulic system.

Since there was no way of determining the actual gas pressure, it was a general practice to pressurize the accumulator when the hydraulic circuit was inoperative and to provide a safety factor in the form of a gas overcharge.

SUMMARY OF THE INVENTION

The present invention provides a piston-type accumulator having a sleeve disposed in the gas portion which enables measurement of the minimum stored energy in the gas portion. The sleeve provides a guaranteed minimum gas volume. A conventional gas pressure gauge may then be used to measure the accumulator gas pressure and/or a pressure switch connected to a warning system can provide an indication of an incipient low pressure condition. If the pressure is above a given minimum value then the accumulator has at least a corresponding amount of energy stored in it.

The above and additional advantages of the present invention will become apparent to those skilled in the art from a reading of the following detailed description when taken in conjunction with the accompanying drawings.

DESCRIPTION OF THE PREFERRED EMBODIMENT

Referring now to the drawing, therein is shown a hydraulic system which includes a hydraulic pump 10 drawing fluid from a reservoir 12 and supplying it through a supply line 14 to a three-way control valve 16. The control valve 16 directs fluid to and from a hydraulic cylinder 18 and is further connected to a return line 20 which returns fluid from the cylinder 18 to the reservoir 12.

An accumulator 22 is connected to a supply line 14 to cushion hydraulic shocks therein and provide a source of backup fluid power. The accumulator 22 includes a cylindrical housing 24 open at both ends. The cylindrical housing 24 is closed at one end by an end plug 26 which contains a through port 28 through which hydraulic fluid passes between the supply line 14 and the inside of the cylindrical housing 24.

An end cap opposite the end plug 26 closes off the other end of the cylindrical housing 24. The end cap 30 is provided with a conventional gas valve 32 which in its normally closed position blocks the passage of gas, generally nitrogen, therethrough. When the gas valve 32 is open, gas may be passed in either direction through the valve so as to charge or bleed the accumulator or measure the pressure therein. The end cap 30 further has a sensing passage 33 provided therethrough.

A piston 34 is slidably disposed in the cylindrical housing 24 between the end plug 26 and the end cap 30. The piston 34 is provided with seals 36 and 38 which prevent the mixing of fluid from the end plug end of the cylindrical housing 24 with the gas in the end cap end. To limit sliding of the piston 34 in the cylindrical housing 24, an inner sleeve 40 is provided between the piston 34 and the end cap 30. The inner sleeve 40 has a predetermined length and a predetermined inside diameter which defines a minimum volume for the gas in the end cap end of the accumulator 22. The inner sleeve 40 is held in place by a seal 42 which encircles the outside diameter and serves as a retainer.

A pressure gauge 44 is connected to the accumulator 22 at the sensing passage 33 to sense the presssure of the gas in the cylindrical housing 24. In the preferred embodiment, an audible warning system is provided which consists of an electrical battery 46 connected to a ground 48 and a conventional normally-closed pressure switch 50. The pressure switch 50 closes below a predetermined pressure of pressurized gas to connect the battery 46 to an audible warning designated by the numeral 52.

In operation, the accumulator is charged to normal pressure which causes the piston 34 to slide in the cylindrical housing 24 away from the inner sleeve 40 to a position where it abuts the end plug 26.

When the hydraulic system is in operation, the accumulator 22 will act in a conventional manner so as to cause movement of the piston 34 and compression of the pressurized gas when hydraulic shock loads are imposed on the remainder of the hydraulic system or the accumulator 22 is being loaded.

While it is possible to intermittently check retained energy through the gas valve 32, with the present system it is possible to constantly monitor the accumulator 22 to determine if there is a sufficient gas charge to allow the accumulator 22 to perform its desired function. If the gas pressure is above a predetermined value, the accumulator 22 is then known to retain at least a corresponding amount of energy sufficient for operation. When the gas pressure drops below the predetermined value, it is evident that the piston 34 must have bottomed against the inner sleeve 40. At this point, the pressure switch 50 will close and the audible warning 52 will sound.

As is evident, monitoring is independent of the operation of the pump 10 because it is the minimum gas pressure which provides the desired information as to retained energy. When the pump 10 is pumping, and there is pressure in the end plug end of the cylindrical housing 24, this pressure due to the pump 10 will never decrease the pressure within the inner diameter of the inner sleeve 40.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. In a hydraulic system having a fluid pump drawing fluid from a fluid reservoir and supplying said fluid to a fluid function through a supply line, a pressure vessel system comprising: a cylindrical housing having first and second open ends; a cylindrical plug member having a port provided therein secured to and closing said first open end of said cylindrical housing, said port fluidly connecting said supply line in said cylindrical housing; a cylindrical cap member having first and second through holes provided therein secured to and closing said second end of said cylindrical housing; a normally closed gas valve disposed in blocking position in said first through hole operable to allow bi-directional flow of gas through said hole; sensing means connected to said second through hole for sensing the pressure of said gas in said cylindrical housing and providing an indication thereof; said sensing means includes a normally-closed pressure switch held open by gas pressure in the cylindrical housing so long as the pressure is above a predetermined value and closable below the predetermined pressure of said gas in said cylindrical housing, and a warning indicator responsive to the closing of said pressure switch to provide an indication thereof; a cylindrical piston slidably disposed in said cylindrical housing between said cylindrical plug member and said cylindrical cap member, said cylindrical piston separating said fluid from said gas; and means disposed between said cylindrical piston and said cylindrical cap member for stopping said cylindrical piston a predetermined distance from said cylindrical cap member and defining a predetermined minimum gas volume.

* * * * *